(12) United States Patent
Ben-Haim et al.

(10) Patent No.: US 8,363,672 B2
(45) Date of Patent: Jan. 29, 2013

(54) OPTIMIZATION OF INTERNET TRAFFIC BASED ON APPLICATION PRIORITIZATION

(75) Inventors: Raz Ben-Haim, Givatayim (IL); Moshe Carasso, Tel Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 817 days.

(21) Appl. No.: 12/435,622

(22) Filed: May 5, 2009

(65) Prior Publication Data
US 2009/0285201 A1     Nov. 19, 2009

Related U.S. Application Data

(60) Provisional application No. 61/051,370, filed on May 8, 2008.

(51) Int. Cl.
*H04J 3/16* (2006.01)
(52) U.S. Cl. ...................................................... 370/468
(58) Field of Classification Search .................. None
See application file for complete search history.

(56) References Cited

U.S. PATENT DOCUMENTS

| | | | |
|---|---|---|---|
| 6,901,048 B1* | 5/2005 | Wang et al. | 370/228 |
| 7,324,447 B1* | 1/2008 | Morford | 370/231 |
| 7,620,055 B1* | 11/2009 | Chandran et al. | 370/395.5 |
| 7,778,176 B2* | 8/2010 | Morford | 370/231 |
| 7,969,996 B2* | 6/2011 | Koide | 370/401 |
| 2001/0055319 A1* | 12/2001 | Quigley et al. | 370/480 |
| 2004/0081197 A1* | 4/2004 | Liu | 370/468 |
| 2004/0202467 A1* | 10/2004 | Luft et al. | 398/4 |
| 2005/0201414 A1* | 9/2005 | Awais | 370/468 |
| 2006/0120369 A1* | 6/2006 | Chandran et al. | 370/390 |
| 2006/0268905 A1* | 11/2006 | Su et al. | 370/401 |
| 2007/0070986 A1* | 3/2007 | Rabenko | 370/352 |
| 2007/0242675 A1* | 10/2007 | Romrell et al. | 370/395.4 |
| 2008/0031141 A1* | 2/2008 | Lean et al. | 370/241 |
| 2009/0059785 A1* | 3/2009 | Jogalekar et al. | 370/230 |
| 2009/0080418 A1* | 3/2009 | Koide | 370/389 |

* cited by examiner

*Primary Examiner* — Otis L Thompson, Jr.
(74) *Attorney, Agent, or Firm* — Banner & Witcoff, Ltd.

(57) ABSTRACT

A method of classifying, scheduling, prioritizing, and optimizing data to provide a final data packet ready for transmission by the modem to the head end. Additionally, a feedback loop is provided to improve scheduling, prioritizing and optimizing data by providing real-time bandwidth availability related information and maximum packet size to be sent over the physical layer.

12 Claims, 8 Drawing Sheets

OPTIMIZATION OF INTERNET TRAFFIC BASED ON APPLICATION PRIORITIZATION

RELATED APPLICATION

This non-provisional application claims the benefit of the following provisional application: U.S. Patent Application Ser. No. 61/051,370, filed May 8, 2008, which is also incorporated herein by reference.

FIELD OF THE INVENTION

The invention relates to the field of data transmission, and in particular to a method of prioritizing user applications to optimize and accelerate Internet traffic.

BACKGROUND OF THE INVENTION

Over the last couple of decades, the Internet has grown to be an increasingly important part of our society. It is not uncommon that a typical user accesses the Internet at work or at school, for example, to send emails or pictures to friends or to conduct business meetings in a web-based conference room. At home, the user may download music, surf websites, watch videos on YouTube, check email, or make phone calls using Voice over Internet Protocol (VoIP). As the selection of applications supported by the Internet grows to meet the needs of users, many users are now utilizing multiple Internet applications on a daily basis. This increase in Internet usage inevitably requires more bandwidth to support the additional traffic on the network. The need to effectively distribute bandwidth is compounded by an increase in users who are multitasking on the Internet, and in particular, running real-time applications that require more bandwidth than non-time-sensitive applications.

Attempting to manage traffic by increasing bandwidth or by accelerating all data for all applications without taking user preferences and priorities into account is inefficient and not cost effective. The cost associated with improving performance in such a fashion is substantial as newer technology available over the Internet requires new and expensive hardware, large-scale programming, and other additional costs to the user. Additionally, current schemes waste bandwidth on applications that can tolerate slower transfer rates, and potentially, do not allocate enough bandwidth to applications that the user would highly prioritize and/or applications where time is of the essence. For example, VoIP likely requires a large amount of bandwidth to ensure seamless real-time communication where one user can talk to another user without annoying delays, choppiness, or other undesirable consequences of Internet lag. Conversely, downloading a song for later playback or browsing the Internet for current news updates is not as time sensitive, and thus, a user would be more likely to tolerate small delays as compared to the VoIP application. In both cases, the user is broadcasting to the modem compressed sound data. However, conventionally, the modem has not distinguished between these sound files. Ideally, a system making a phone call over VoIP and downloading music concurrently would prioritize un-interruption of the phone call over saving a few minutes in music download time. Users are likely to tolerate slower transfer rates for non-priority applications if sufficient transfer rates for priority applications are provided along with the additional benefit of cost savings.

BRIEF SUMMARY OF THE INVENTION

Aspects of the present invention include a cost effective system that can more efficiently allocate bandwidth based on priorities while allowing users to fully enjoy high priority applications while tolerating small delays on non-priority applications.

In some embodiments, a device may be configured to execute an algorithm to prioritize and shape data prior to transmission. The device may itself be variously configured, and the algorithm may also be variously configured. The device may be any device that sees the data prior to the data being sent to a network modem. Alternatively, the device may be inside the network modem. For example, it may be a PC serving a single user, an external hardware device distributed between the associated computer and the modem, or the device may be embedded into the modem itself. The algorithm may also be in either software which is installed on a single user PC or a server serving multiple users or even installed inside the modem itself. In one example, the algorithm may be stored as computer-executable instructions within storage media such as random access memory (RAM), read-only memory (ROM), a compact disc (CD), and the like. The algorithm executed by the device processes and shapes the data for transmission by the modem to the head end. In a one embodiment, the device receives the data from the computer and prioritizes the data in accordance with a set of dynamically variable or predefined criteria such that the more time-sensitive applications are given higher priority over applications that are not as time-sensitive. Where the necessary bandwidth for reliable priority application (e.g., VoIP) communication is not available, the modem may request from the headend that additional bandwidth be allocated to the modem to support the high priority application. Additionally, applications with the same data pattern may be grouped together. Based upon the prioritization, data is scheduled, and further optimized for delivery by selectively accelerating and compressing the data. The traffic may also be optimized by packing and fragmentation before the final data packet is transmitted to the modem for delivery. The method may also receives from time to time updated data from the modem regarding the current available bandwidth for transmission and act accordingly whether it will be to lower data rate of non essential applications or request additional bandwidth for transmission.

DETAILED DESCRIPTION OF THE INVENTION

In general, when the solution is inside a VSAT or PC or any other hardware device it may well be implemented as a software component and not necessarily a hardware components.

Figure 1:
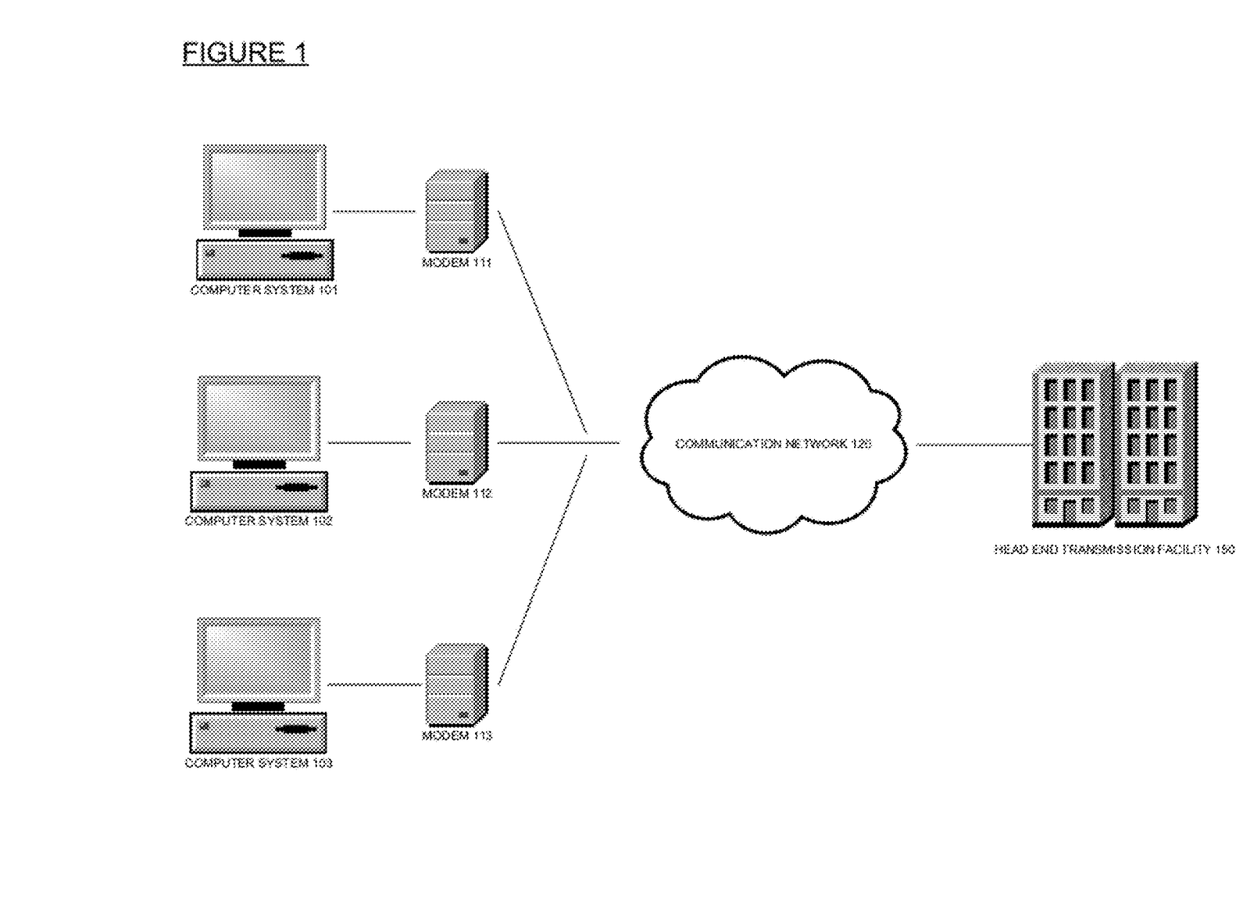
FIG. 1 shows a system for optimizing Internet traffic in accordance with the exemplary embodiments.

Referring to FIG. 1, a system for optimizing Internet traffic is shown wherein a plurality of end terminal devices 101, 102, and 103 are connected to the communication network 120 via hardware interface devices 111, 112, and 113. The terminal devices 101-103 may be variously configured to be VoIP phones, computers, and/or other types of terminal devices. For example, the terminal device 101 may include a VoIP phone and/or a computer. The hardware interface devices typically include some type of interface circuitry for interfacing to the communication network 120. In exemplary embodiments, the hardware interface devices include a modulator and a demodulator and will be referred to herein as modems 111-113 for simplicity in the rest of the application. The communication network 120 communicates with the modems 111-113 and also with the head end 150. The communications network 120 may be variously configured, but in one embodiment it includes a satellite network. Alternatively, it may include a wireless or cellular network. While this embodiment is not network dependent, here, the modem devices include VSAT terminals and the head end transmission facility 150 includes an earth station hub coupled via a gateway to a public switched telephone network (PSTN) and via another gateway and/or router to the Internet. Alternatively, the communication network 120 may itself be the Internet.

Additionally, the plurality of computing devices may communicate with each other through the communication network 120. For example, in peer-to-peer VoIP applications, the individual terminal devices 101-103 may communicate directly with each other by virtue of the communication network 120 either looped back through the head end transmission facility 150 or directly through the network where the network supports direct connections. Additionally, the terminal device may have multiple sessions where some communicate with other terminal devices through the head-end transmission facility 150 which may include a gateway providing access to the public switched telephone network and other communicate in a peer-to-peer network.

Figure 2:
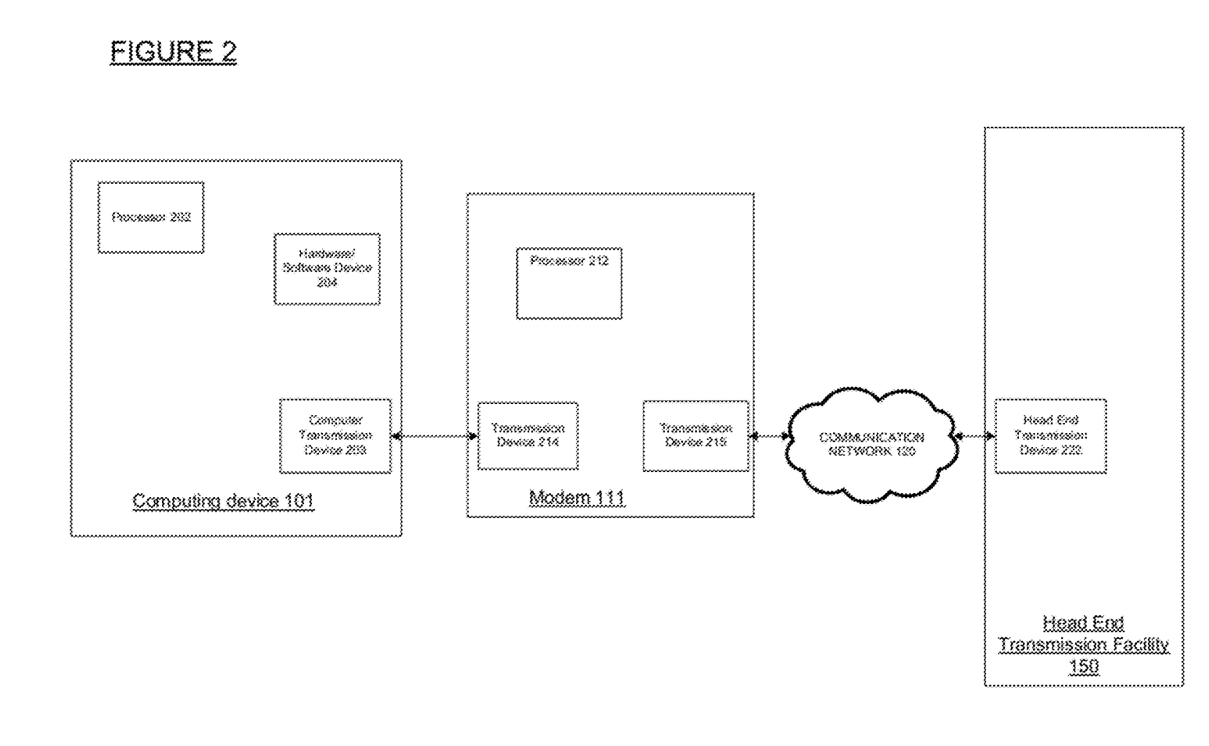
FIG. 2 shows a computer system and a head-end with a hardware device within the computing device in accordance with the exemplary embodiments.

Referring to FIG. 2, a computing device 101 and a head-end transmission facility 150 in accordance with the exemplary embodiments are shown. The computing device 101 may be variously configured. For example, the computing device 101 of FIG. 1, may include one or more computational devices such as processor 202. The processor 202 may receive information about the character and/or nature of certain applications. For example, the computing device 101 may include a facility that enables applications to register their nature and/or bandwidth requirements. For example, VoIP and/or real-time gaming applications may register a need for a certain committed information rate. This may either be initiated by the application itself and/or may be determined by a device drive that analyzes the calling applications Internet traffic configuration needs. The processor 202 determines the nature and character of the application that requires information and/or bandwidth. The processor 202 then communicates with the hardware device 204. The processor 202 provides the hardware device 204 data indicating that certain applications require bandwidth having particular characteristics in order to send and/or receive data. For example, VoIP applications may be assigned certain compression, priority, and channel characteristics. Whereas downloading of MPEG and other files may be assigned different compression, priority, and channel characteristics. For example, where the user is simply browsing web pages, the modem maintains a standard data configuration. However, where the user opens an application such as a VoIP phone going off-hook, or an interactive video game entering multi-player network mode, the computing device may indicate to hardware device 204 that an alternate channel characteristic should be opened to support the application. The hardware device may communicate with the modem 111 through devices 203 and 214 and the modem 111 may open the facility itself, and/or coordinate with the head end transmission facility 150 to negotiate suitable resources. For certain applications such as VoIP, the down-stream bandwidth may be reduced to save overall system costs while the upstream bandwidth is increased to handle full duplex voice. In this manner, the asymmetric network characteristics may be dynamically varied depending on the particular applications present needs as determined by the computing device 101.

The hardware device 204 may be configured to prioritize the requests, optimize the data to be sent and pass the data through transmission devices 203 and 214 to the modem 111 for transmission to the head end transmission facility 150 through devices 215 and 222. The head end transmission facility 150 may send information back to the modem 111 via transmission devices 222, 215. The modem 111 may send information back to the computing device 101, including the hardware device 204, via transmission devices 203, 214. In one alternative, hardware device 204 may instead be implemented as software stored on a storage device such as physical memory (e.g., RAM, ROM, CD, hard-drive, etc.)

Figure 3:
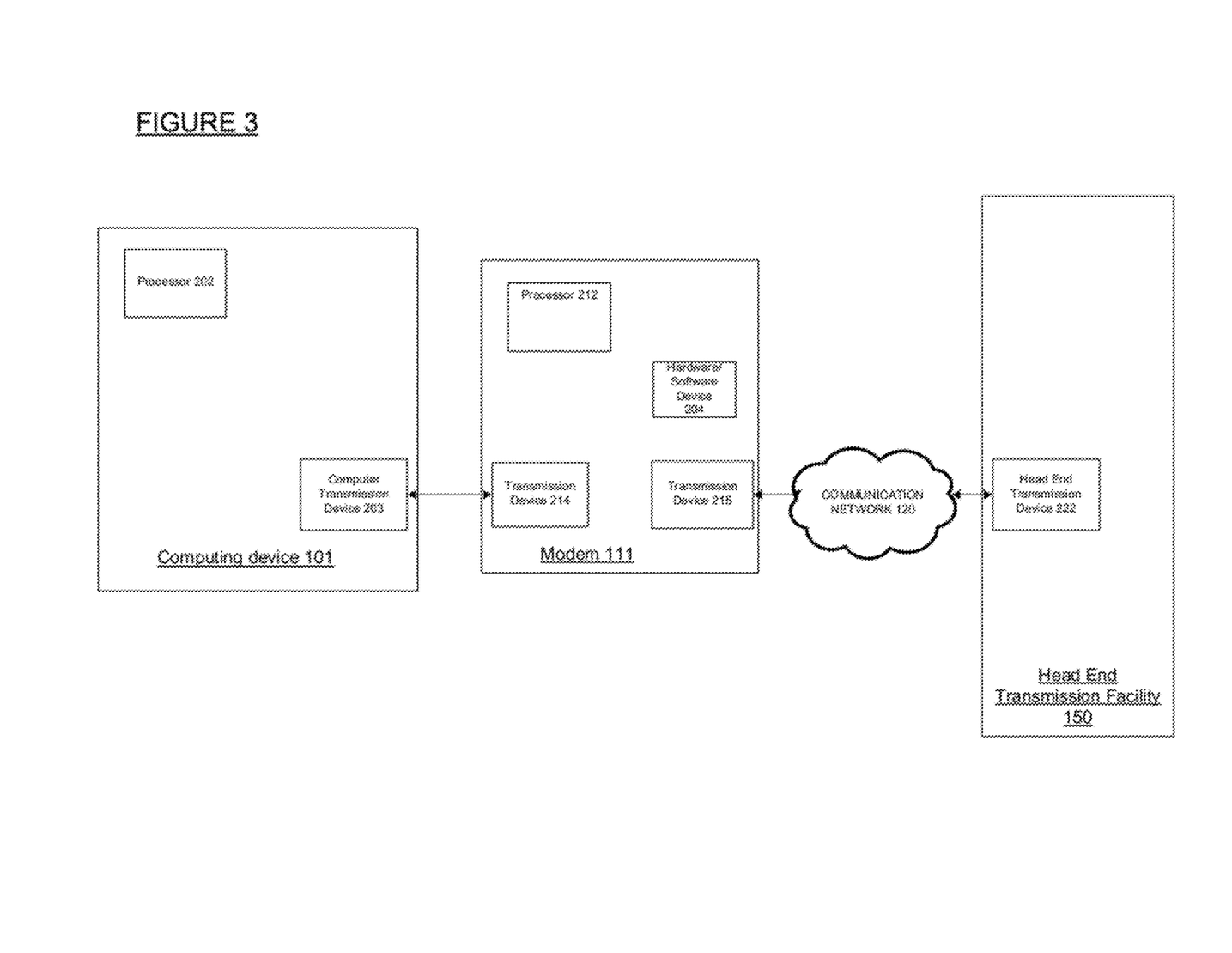
FIG. 3 shows a computer system and a head-end wherein the hardware device is within the modem in accordance with the exemplary embodiments.

FIG. 3 is an alternative exemplary embodiment where the hardware device 204 may be located inside the modem 111.

Figure 4:
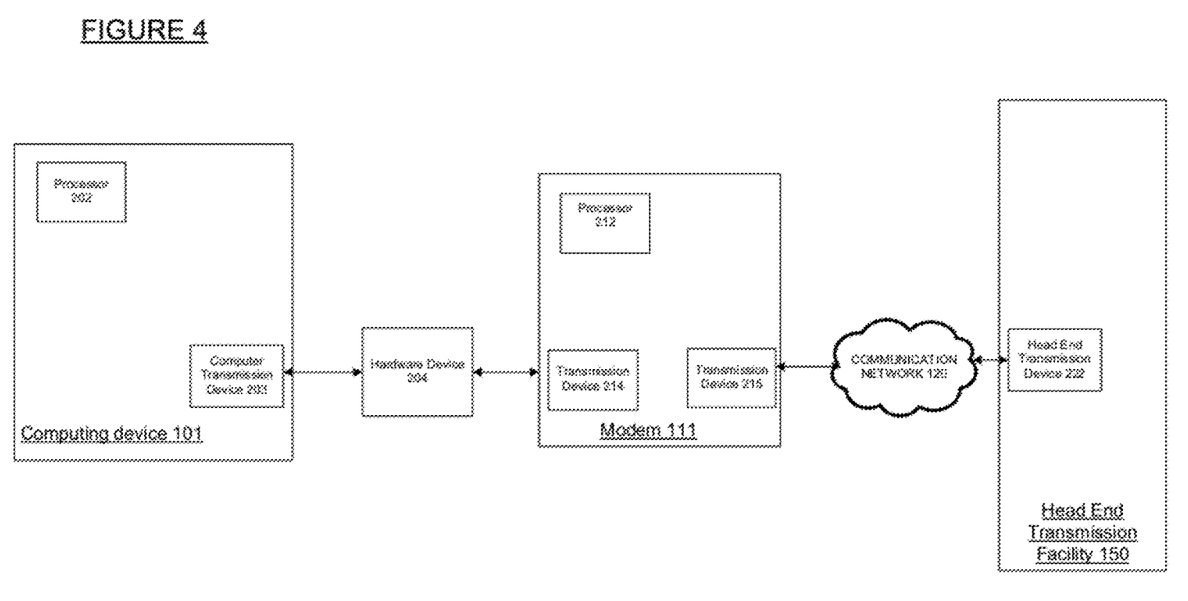
FIG. 4 shows a computer system and a head-end wherein the hardware device is external to the computing device and modem and located between the computing device and modem in accordance with the exemplary embodiments.

FIG. 4 is an alternative exemplary embodiment where the hardware device 204 may be located external to and between the computing device 101 and the modem 111.

Figure 5:
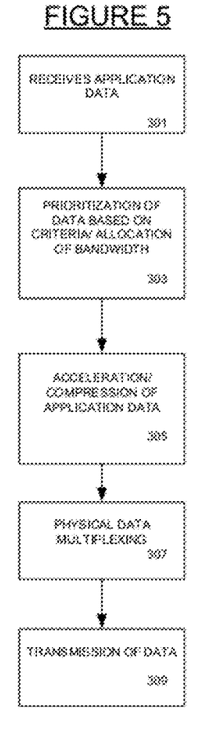
FIG. 5 shows a flowchart of a method for shaping and optimizing application data to be sent to the head-end in accordance with the exemplary embodiments.

Referring to FIG. 5, a flowchart of a method for shaping and optimizing application data to be sent to the head-end in accordance with the exemplary embodiments is shown. At block 301, the hardware device 204 receives notification and application information corresponding to the one or more applications that require bandwidth from the computing device 101. At block 303, the hardware device 204 shapes traffic including prioritization of the application data based on criteria that may be dynamically variable or predefined. The more time-sensitive applications may be given higher priority and/or more bandwidth over applications that are not as time-sensitive. Optionally, the hardware device 204 may determine whether an application is considered a super-priority application. Super-priority applications may be given enough bandwidth to be fully functional leaving the other applications to divide up any remaining bandwidth. An example of a super-priority application may be a VoIP application where it is important to the user that his real-time call be uninterrupted and not delayed. Additionally, applications with compatible data patterns may be grouped together. For example, certain predefined data from some applications may comfortable coexist on the same priority, compression, bandwidth. Based upon the determined prioritization, at block 305, hardware device 204 may be configured to send the optimally accelerated and compressed data to the modem transmission device 215 for transmission. At block 307, the data may be optionally multiplexed with other data needing to be sent to the head end 150. At block 309, the modem transmission device 215 sends the data to the head end 150 in the data's allocated bandwidth.

Figure 6:
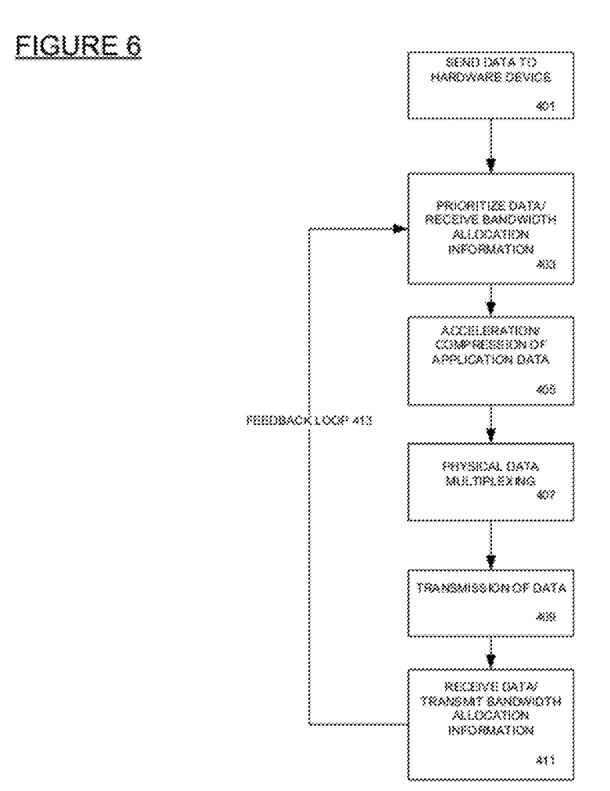
FIG. 6 shows a flowchart of a method for prioritizing and/or optimizing data to be sent.

Referring to FIG. 6, a flowchart describing an exemplary system for any one of the plurality of computers and modem pairs is shown. The data including which applications are requesting the bandwidth and the purposes for the request is passed along from the computing device 101 to the modem 111 at block 401. At block 403, the modem 111 prioritizes the applications and their bandwidth requirements. In this preferred embodiment, real-time bandwidth availability information may be obtained utilizing the feed-back loop 411 between the hardware device 204 and the modem 111. Such information can be useful, for example, in real-time bandwidth allocation determinations. To the extent sufficient bandwidth is not available, in some embodiments, this fact may be feedback to the processor 202 so that the application can configure for a degraded operating mode (e.g., 2.4 Khz for VoIP applications). When additional bandwidth becomes available, this information may be communicated to the application and the data rate of the VoIP session increased to utilize the available bandwidth. The head end 150 may allocate additional bandwidth based on the priority of the application. In another embodiment, the allocation of bandwidth may take place at the modem 111. Allocation of bandwidth is not limited to the total bandwidth originally allocated to the user but may be applicable across the entire system such that if there is available network space or bandwidth on the system, it may be allocated to the most time-sensitive application. For example, bandwidth from computer system 102 may be reallocated to computer system 101 depending on the dynamic mix of applications running on the collective computer systems (e.g., 101-103). The hardware device 204 may be configured to prioritize the data at block 403. Prioritization can be based on predefined or dynamically variable criteria. Additionally, the client can request additional bandwidth on demand for the applications which require it. After the prioritization and bandwidth allocation as shown in block 403, the hardware device 204, at block 405, may be configured to accelerate and compresses the data for different applications based on their prioritization and/or bandwidth allocated to the particular application. At block 407, the data may be optionally multiplexed with other data needing to be sent to the head end 150. The modem 111 may then send the data to the head end transmission device 222 located at the head end facility 150 at block 409. The information may be received by the head end transmission device 210 at block 411. The head end transmission device 210 may pass information back to the modem via feedback loop 413. Information passed back may include real-time bandwidth availability.

In a preferred embodiment, the client may be running three Internet applications concurrently. For example, the three applications include a VoIP application, a music downloading application, and an email application. All three applications require the Internet and, as such, the data requesting bandwidth for data transfer is passed along from the personal computer 101 to the hardware device 204 at block 401. At block 403, the hardware device 204 prioritizes, based on predefined criteria, the three applications and determines that the VoIP application is a high priority application and the other two applications are medium or low priority. Based on this prioritization, the data for the three applications are optimally compressed and accelerated at block 405. The data is then sent in their respective reserved bandwidth slots at block 409. As the VoIP application completes the call and is in a waiting state or any other state where the bandwidth requirements are lower than when a call is active, the priority level drops and bandwidth is dynamically re-distributed among the other running applications. For example, where the call is on-hold and/or experiencing periods of silence, the bandwidth may be dynamically deallocated even though the call is still active. Such information, for example, may take advantage of the feedback loop 413 and keep the system efficient.

Should another call on the VoIP application be initiated or otherwise active, the bandwidth would again be re-distributed to reflect the priority of the additional VoIP call. The feedback loop 413 can also function, for example, as a way for the hardware device 204 to receive real-time bandwidth availability information. Described exemplary methods may also be configured to fit data transfers from the head end to the remote stations and is applicable to other systems such as paying for gas at the gas pump, and further applicable to other scenarios not described.

Figure 7:
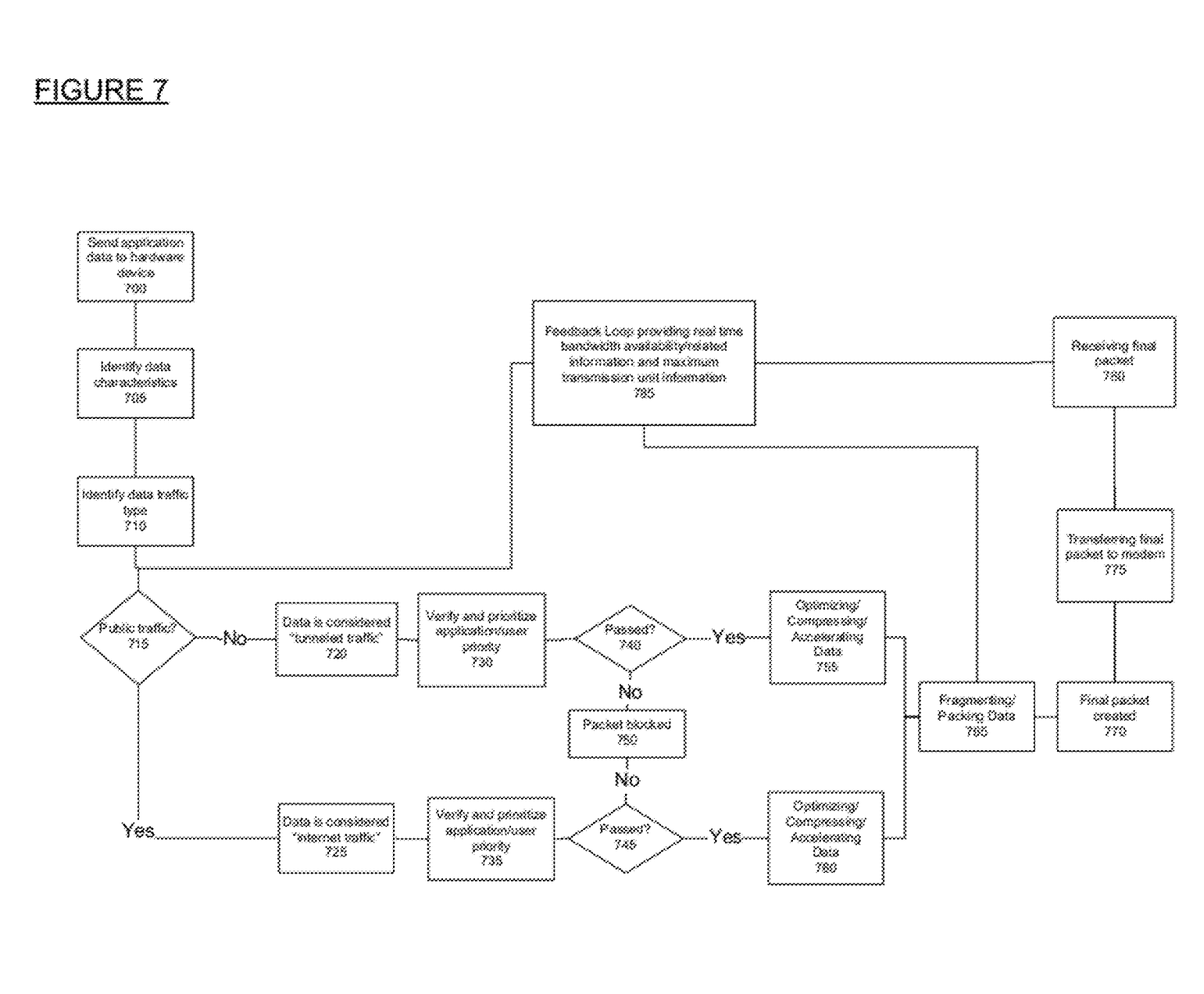
FIG. 7 shows a flow chart of a method for classifying, scheduling/prioritizing and optimizing data to be sent.

Referring to FIG. 7, a flowchart describing an exemplary system for any one of the plurality of computer, hardware device, and modem combinations is shown. The data including which applications are requesting the bandwidth and the purposes for the request is passed along from the computing device 101 to the hardware device 204 at block 700. At block 705, the hardware device 204 executes a pre-defined or dynamically configurable algorithm that may classify the data according to various criteria, for example, by IP address, port address, or application signature. In this exemplary embodiment, the algorithm further classifies the data by the traffic type. For example, the traffic type may be tunneled traffic or internet traffic. The traffic type may determine the path of the data. For example, data of one traffic type may be sent along one path and the data of another traffic type may be sent along another path. The algorithm which prioritizes the data of the plurality of paths may be variously configured. In this embodiment, the data classified as tunneled traffic if it determined that it is not public traffic at block 715 and the data classified as internet traffic if it is determined that it is public traffic at block 715. Depending on traffic type, the data may follow different paths but are subjected to a similar exemplary algorithm. In another embodiment, different traffic types may require different algorithms. At blocks 725 and 735, the algorithm may require the hardware device 204 to verify the priority of the tunneled traffic data and internet traffic data, respectively. Priority may be based on the user priority, the application priority, or the algorithm may require a priority determination based on a combination of different priority criteria. Data is passed according to the predefined or dynamically configurable criteria at blocks 740 and 745. In some instances, low priority data may not be passed along for optimization but is instead blocked at block 750. This data may be passed along later according to the criteria. Next, the prioritized data that is passed along may be optimized. For example, data may be optimized by optimizing, compressing, and accelerating at blocks 755 and 760. Data may also be fragmented and packed at block 765. The final data packet is created at block 770 and transferred to the modem at 775. The data is received by the modem at block 780. Optionally, there may be a feedback loop between the modem 111 and the hardware device 204 (see block 785) which enhances the traffic optimization. For example, the feedback loop 785 may indicate information related to the available, real-time bandwidth for the data transmission. A constant pooling mechanism may provide information for every predefined time frame which may be useful since factors such as total bandwidth available, current traffic rate, current traffic type vary without notice. For example, addition of users with more absolute priority may lower available bandwidth for lower priority users. With this information, traffic scheduling and traffic optimization may be customizable to current conditions and thus efficiency is improved. The feedback loop may also have specific traffic optimization information. This information, for example, may include information related to the largest packet size that may be transmitted in the allotted bandwidth. The feedback loop may also indicate information that may assist in determining whether the schedule and optimization steps are even necessary. In one embodiment, the algorithm may require the data to bypass the schedule and/or optimization steps. In one embodiment, after the data and traffic is optimized, a final data packet is produced and sent to the modem for transmission.

Figure 8:
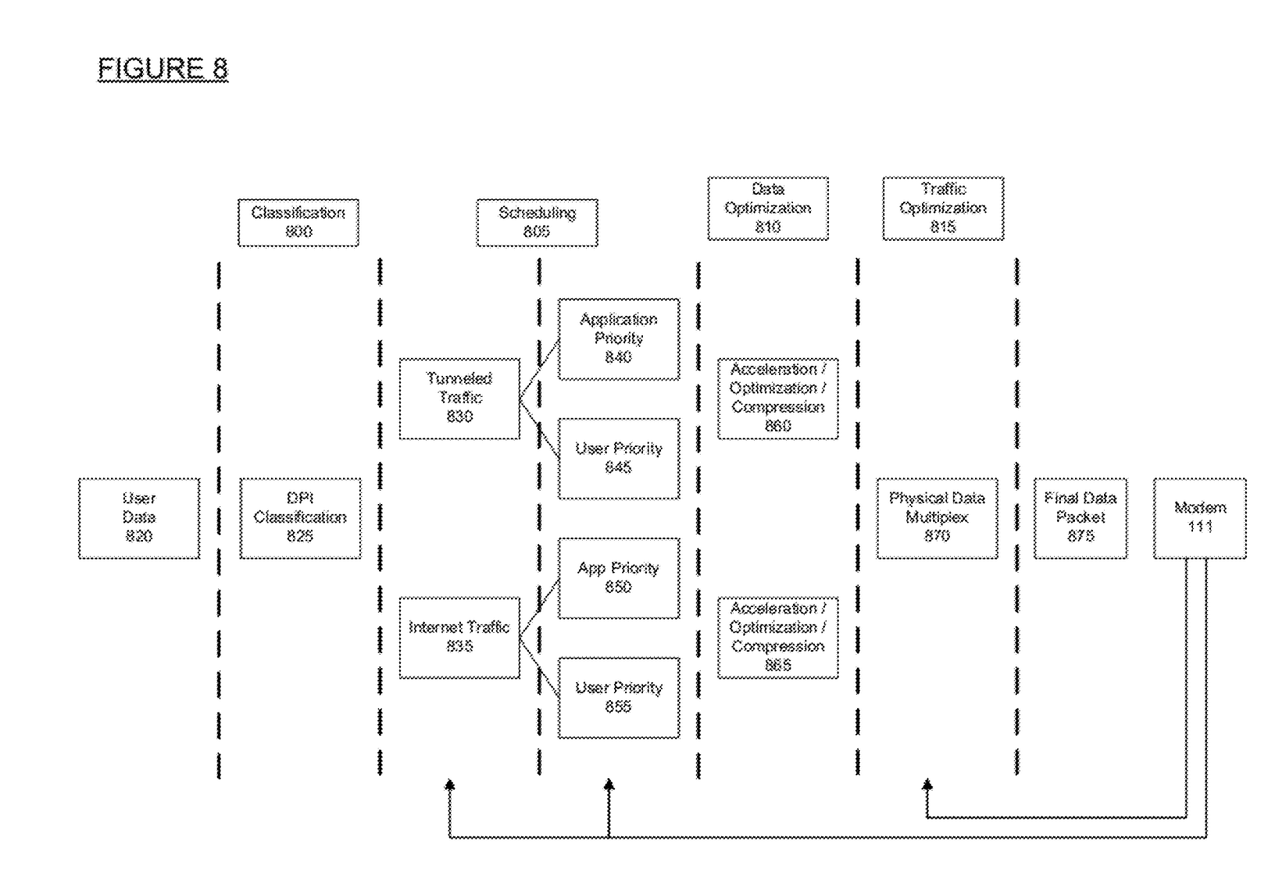
FIG. 8 shows a four-phase method for classifying data, scheduling/prioritizing data, optimizing data and optimizing the traffic before the data is sent to the headend.

Referring to FIG. 8, a four-phase data path in accordance with the exemplary embodiment is shown. In this exemplary embodiment, each phase is not mandatory, but adds to the efficiency of the traffic. These phases may be added in a scalable mode according to the need and physical capabilities of the hardware device 204. One such phase may be a classification phase as shown by block 800. In this phase, the user data 820 may be processed by a classification engine at DPI Classification 825 which is capable of classifying the data according to various parameters such as port number, IP address, or application signature. After the data is classified by the classification phase 800, it may be passed to an exemplary scheduling phase 805. This phase may be constantly updated by the modem 111 about the actual characteristics of the connection such as available bandwidth which may vary based on different real-time variables. The scheduling phase functions according to a set of pre-defined or dynamically configurable criteria and handles scheduling of the traffic. The criteria may include, for example, traffic destinations, application type, or use type. The scheduling phase 805 may also classify and/or separate the data into tunneled traffic or internet traffic at blocks 830 and 835. Tunneled traffic data is verified and prioritized based on predefined or dynamically configurable criteria such as application priority, user priority, or a combination of both. Internet traffic data is verified and prioritized in a similar, configurable fashion. The outcome of this phase may be traffic volume after filtering which may be sent over the physical layer and may be passed on to another phase. Such a phase, for example, may be a data optimization phase. In the data optimization phase at block 810, available traffic volume may be increased by the application of several real-time optimization methods such as acceleration, optimization, and compression. One or more optimization methods may be applied to the data volume to eliminate the waste of system resources for unwanted traffic types. Next, the data may be passed through a traffic optimization phase at block 815. This phase may optimize the physical traffic path by any number of traffic optimization techniques. For example, one such technique may be fragmentation and packing located at block 870. When possible, fragmentation and packing configures data into the largest physical packet size to be transmitted over the bandwidth, and may lower system resources on packets-per-second volume and maximize bandwidth efficiency. The result of the data passing through the various, configurable phases is a final data packet sent to the modem for transmission. In one embodiment, a feedback loop is present between the modem 111 and hardware device 204 executing the algorithm which may include various configurations of the four-phases of optimization. The feedback loop may provide information related to the available, real-time bandwidth for the data transmission. A constant pooling mechanism may provide information for every predefined time frame which may be useful since factors such as total bandwidth available, current traffic rate, current traffic type vary without notice. Such information, for example, may be taken into account in the schedule phase in determining scheduling and priority. For example, addition of users with more absolute priority may lower available bandwidth for lower priority users. With this information, traffic scheduling and traffic optimization may be customizable to current conditions and thus efficiency is improved. The feedback loop may also have specific traffic optimization information. This information, for example, may include information related to the largest packet size that may be transmitted in the allotted bandwidth. This information may be helpful in the traffic optimization phase in determining the maximum transmission unit size supported. With this information, the traffic optimization is improved as sending data packets smaller than the maximum size supported may result in a slower transmission. The feedback loop may also indicate information that may assist in determining whether the schedule and optimization phases are even necessary. In one embodiment, the algorithm may require the data to bypass the schedule and/or optimization phases. In one embodiment, after the data and traffic is optimized, a final data packet is produced and sent to the modem for transmission.

In a preferred embodiment, VoIP is concurrently active with other applications such as webpage browser and/or transferring over a home or office network. This data passed to a data packet identifier and is classified based on application signature or other criteria. Next, the traffic type of the data is determined. For example, VoIP data and webpage browser data may be internet traffic and file transferring over a home or office network may be considered tunneled traffic. The data is then passed to the path which it corresponds. For example, VoIP data and webpage data is passed along the internet traffic path and the file being transferred over the intranet is passed along to the tunneled traffic path. Next, the data is scheduled and prioritized based on application priority and other factors, such as user priority or may be scheduled and prioritized based on a combination of factors according to the criteria. VoIP may be given priority and given access to a higher percentage of bandwidth over the other traffic. The FTP or webpage data may be highly compressed and accelerated while allocated a lower amount of bandwidth. Such a tradeoff is acceptable as the webpage access or the FTP transfer is not as time-sensitive as compared to the VoIP application. Prioritizing of bandwidth is not limited to the user allocated bandwidth but is applicable across the entire system such that if there is available network space or bandwidth on the system, it may be allocated to the most time-sensitive application. Following data optimization, traffic optimization may occur. Here, the processed data is fragmented and packed forming the final data packet which is sent to the modem for transmission.

In a preferred embodiment, the application running inside the modem or hardware device has selective acceleration. In a situation where two or more applications are running simultaneously on the user's machine, the classification and scheduling of the data corresponding to the different types of applications may be based off of pre-defined or dynamic criteria. In addition subsequent data and traffic optimization includes optimizing the bandwidth in accordance with the various applications. For example, where the user is utilizing an application to browse a webpage and an application to perform VoIP or another real-time application, the application with the real-time VoIP is prioritized and accelerated over the application that is accessing the webpage. Additionally, the modem may be able to switch the processor bandwidth over to the Transmission Control Protocol (TCP) acceleration as the real-time application is terminated. Also, even within a single application such as a web-browser, the Quality of Service (QoS) client and the hardware device, for example inside a modem or a computing device, may be configured to determine what types of data are currently being accessed based on, for example, the IP address being accessed. For example, accessing a VoIP gateway, and the address associated with the VoIP gateway would be given priority over an IP address of a search application, such as a search engine. This concept is not limited to VoIP gateways and can extend to unlimited number of applications. In a situation where the user is purchasing gas at a gas pump, the transactions associated with the credit card initiation and verification would be given priority over other applications such as FTP transfers or web browsing applications. In a preferred embodiment, priority or super priority is given to call-set-up matters such as Session Initiation Protocol (SIP) or H.323 protocol. In this manner, the call-set-up has super priority over traffic such as simple web page access and even VoIP data. The client may automatically be allocated additional bandwidth on demand based on the particular application the client is running at the time such as sending/receiving SIP configuration information and/or communicating control information with a H.323 gateway. For example in a VoIP session, as the user initiates the session, he is granted real-time high priority bandwidth to make, progress, and complete the call. In another example, where the user is watching video off the Internet, the user's downstream bandwidth is increased so that the video can appear on the user's screen uninterrupted in real-time. Thus, the overall perceived bandwidth that the user has and the user experience with the satellite-delivered Internet access and VoIP is enhanced.

In another embodiment, multiple high-priority, bandwidth intensive applications are concurrently active. For example, a client is running a VoIP application to make a phone call while streaming real-time video off the Internet. Here, the bandwidth required to ensure both a smooth uninterrupted phone call and a real-time video playback is substantial and it would be advantageous if the client could request additional bandwidth on demand to enjoy active applications without a sacrificing performance.

Accordingly, a device may advantageously be configured to utilize a less-expensive processor and still provide uninterrupted real-time voice or video. For example, by improving the intelligence of the acceleration client to make decisions about which data and applications to accelerate, the overall costs for the system are substantially reduced while the user's experience with the system is substantially uninhibited.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A method comprising:
   receiving, at a hardware device, application data for transmission by one or more application programs;
   classifying the received application data, at the hardware device, based on a set of parameters comprising at least one of a port number, an IP address, and an application signature;
   determining, at the hardware device, whether the application data corresponds to tunneled traffic or non-tunneled traffic based on the classification;
   processing the application data along one of two processing paths depending on whether the application data corresponds to tunneled traffic or non-tunneled traffic;
   in at least one of said processing paths, prioritizing the application data in accordance with a set of predefined rules, wherein according to the prioritizing call set-up matters are given super priority over VoIP data, and VoIP data is given priority over data transfer applications;
   optimizing the application data in real time, wherein the optimizing performed depends on whether the application data corresponds to tunneled traffic or non-tunneled traffic;
   compressing the application data, wherein the compressing performed depends on whether the application data corresponds to tunneled traffic or non-tunneled traffic;
   accelerating the application data, wherein the accelerating performed depends on whether the application data corresponds to tunneled traffic or non-tunneled traffic;
   fragmenting and packing the application data;
   transmitting the application data over a transmission channel to a head end;
   receiving feedback from the head end concerning a current amount of available bandwidth;
   determining a current bandwidth requirement for at least one application program; and
   dynamically varying the bandwidth allocated to the at least one application program based on the determined current bandwidth requirement for at least one application program and based on the available bandwidth feedback received from the head end.

2. The method of claim 1, wherein each of the two processing paths includes at least a scheduling step, wherein said scheduling step comprises:
   receiving available bandwidth information; and
   scheduling application data for transmission in accordance with the received available bandwidth information.

3. The method of claim 1, wherein packing the application data comprises:
   receiving packet size information; and
   packing the application data in accordance with the received packet size information.

4. The method of claim 1, wherein a super priority is provided to communications with an IP address of a H.323 gateway.

5. The method of claim 1, wherein a super priority is provided to applications currently running a SIP setup protocol.

6. The method of claim 1, wherein optimizing the application data further comprises:
   dynamically varying a compression of a VoIP application based on the available bandwidth and increasing or decreasing the compression and the associated voice quality based on feedback from the head end concerning available bandwidth.

7. An apparatus comprising:
   a processor;
   a memory storage device configured to store instructions that when executed by the processor, cause the apparatus to:
      receive application data for transmission by one or more application programs;
      classify the received application data based on a set of parameters comprising at least one of a port number, an IP address, and an application signature;
      determine whether the application data corresponds to tunneled traffic or non-tunneled traffic based on the classification;
      process the application data along one of two processing paths depending on whether the application data corresponds to tunneled traffic or non-tunneled traffic;
      in at least one of said processing paths, prioritize the application data in accordance with a set of predefined rules, wherein according to the prioritizing call set-up matters are given super priority over VoIP data, and VoIP data is given priority over data transfer applications;
optimize the application data in real time, wherein the optimizing performed depends on whether the application data corresponds to tunneled traffic or non-tunneled traffic;
compress the application data, wherein the compressing performed depends on whether the application data corresponds to tunneled traffic or non-tunneled traffic;
accelerate the application data, wherein the accelerating performed depends on whether the application data corresponds to tunneled traffic or non-tunneled traffic;
fragment and pack the application data;
transmit the application data over a transmission channel to a head end;
receive feedback from the head end concerning a current amount of available bandwidth;
determine a current bandwidth requirement for at least one application program; and
dynamically vary the bandwidth allocated to the at least one application program based on the determined current bandwidth requirement for at least one application program and based on the available bandwidth feedback received from the head end.

8. The apparatus of claim 7, wherein each of the two processing paths includes at least a scheduling step, wherein said scheduling step comprises:
receiving available bandwidth information; and
scheduling application data for transmission in accordance with the received available bandwidth information.

9. The apparatus of claim 7, wherein packing the application data comprises:
receiving packet size information; and
packing the application data in accordance with the received packet size information.

10. The apparatus of claim 7, wherein a super priority is provided to communications with an IP address of a H.323 gateway.

11. The apparatus of claim 7, wherein a super priority is provided to applications currently running a SIP setup protocol.

12. The apparatus of claim 7, wherein optimizing the application data further comprises:
dynamically varying a compression of a VoIP application based on the available bandwidth and increasing or decreasing the compression and the associated voice quality based on feedback from the head end concerning available bandwidth.

* * * * *